(12) United States Patent
Wiley

(10) Patent No.: US 10,434,664 B2
(45) Date of Patent: Oct. 8, 2019

(54) LAMELLAR COVERS FOR USE WITH ARTICULATING JOINTS

(71) Applicant: Facebook, Inc., Menlo Park, CA (US)

(72) Inventor: Scott C. Wiley, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 530 days.

(21) Appl. No.: 15/178,187

(22) Filed: Jun. 9, 2016

(65) Prior Publication Data

US 2017/0356488 A1 Dec. 14, 2017

(51) Int. Cl.
| | |
|---|---|
| *B25J 19/00* | (2006.01) |
| *B25J 17/02* | (2006.01) |
| *F16C 11/06* | (2006.01) |

(52) U.S. Cl.
CPC ....... *B25J 19/0075* (2013.01); *B25J 17/0275* (2013.01); *F16C 11/0609* (2013.01); *B25J 17/02* (2013.01); *F16C 2322/59* (2013.01)

(58) Field of Classification Search
CPC .............................. B25J 17/02; B25J 19/0075
See application file for complete search history.

(56) References Cited

U.S. PATENT DOCUMENTS

| | | | | |
|---|---|---|---|---|
| 2010/0274193 A1* | 10/2010 | Patton | ................ | A61B 17/3462 604/167.01 |
| 2015/0196322 A1* | 7/2015 | Sauter | ................ | A61B 17/3462 604/167.06 |
| 2017/0079244 A1* | 3/2017 | Mullin | ................ | A01K 15/026 |

* cited by examiner

*Primary Examiner* — Jonathan P Masinick
(74) *Attorney, Agent, or Firm* — FisherBroyles, LLP

(57) ABSTRACT

A lamellar cover for use with an articulating joint is disclosed. The cover includes an annular retainer positionable adjacent a first portion of the articulating joint. A retainer fitting is positionable adjacent a second portion of the articulating joint that is moveable with respect to the first portion. A plurality of overlapping lamellar rings are supported between the annular retainer and the retainer fitting. Each lamellar ring includes a circular support ring, such as an o-ring, and a plurality of lamellas coupled to the circular support ring. One or more connectors extend between adjacent lamellar rings. Each of the plurality of overlapping lamellar rings has a ring diameter. One or more of the ring diameters decrease in size with respect to each other from the annular retainer to the retainer fitting thereby forming a tapered cover around the articulating joint.

19 Claims, 8 Drawing Sheets

LAMELLAR COVERS FOR USE WITH ARTICULATING JOINTS

TECHNICAL FIELD

This patent application is directed to covers for use with moveable joints.

BACKGROUND

Movement between machine parts is often accomplished with sliding or articulating joints, for example. It is desirable to cover these types of joints to protect the moving parts from dirt and to contain lubricants. Machine joints are often covered with flexible boots or bellows. These types of covers are satisfactory for controlling dust and lubricant but generally do not provide protection against intrusion into the machine joint's operating envelope.

BRIEF DESCRIPTION OF THE DRAWINGS

The lamellar covers for use with articulating joints introduced here may be better understood by referring to the following Detailed Description in conjunction with the accompanying drawings in which like reference numerals indicate identical or functionally similar elements.

Figure 1:
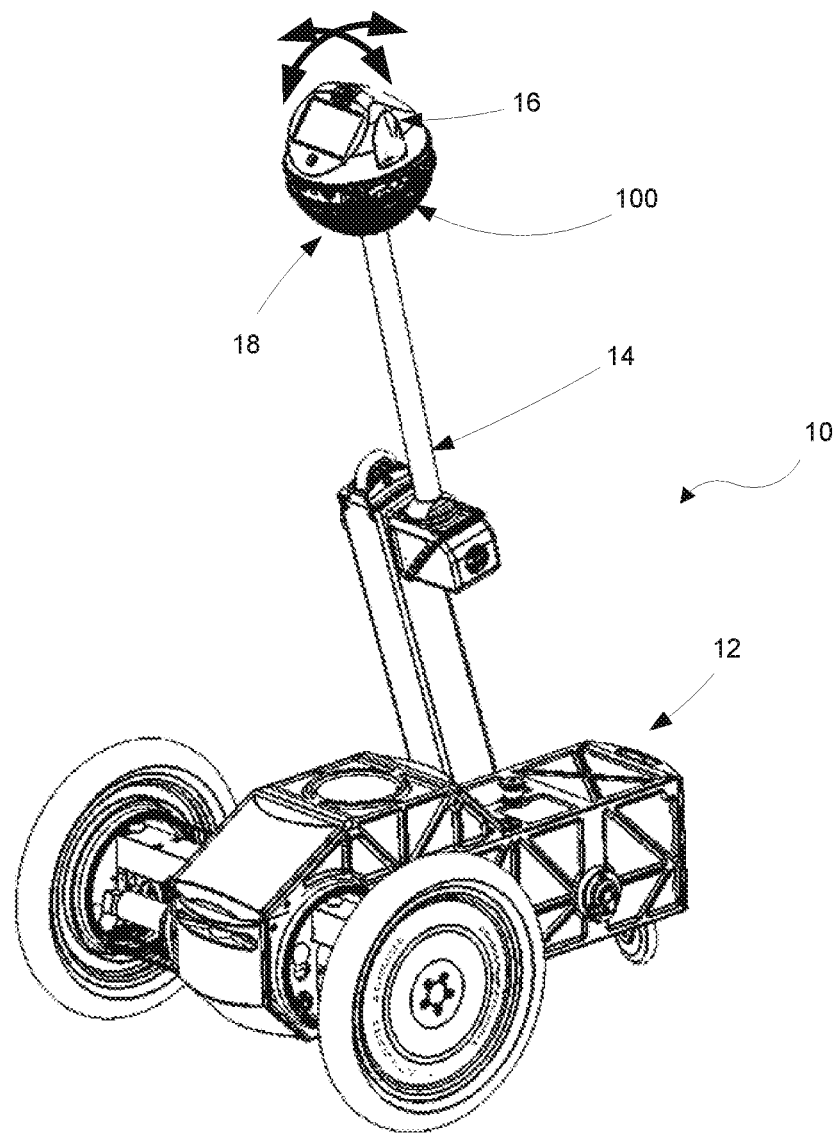
FIG. 1 is a perspective view of a data center robot incorporating a lamellar cover according to a representative embodiment.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of this disclosure.

DETAILED DESCRIPTION

Overview

A tapered lamellar cover for use with an articulating joint is disclosed. In a representative embodiment, the cover includes an annular retainer positionable adjacent a first portion of the articulating joint. A retainer fitting is positionable adjacent a second portion of the articulating joint that is moveable with respect to the first portion. A plurality of overlapping lamellar rings are supported between the annular retainer and the retainer fitting. Each lamellar ring includes a circular support ring, such as an o-ring, and a plurality of lamellas coupled to the circular support ring. One or more connectors extend between adjacent lamellar rings. Each of the plurality of overlapping lamellar rings has a ring diameter. In some embodiments, one or more of the ring diameters decrease in size with respect to each other from the annular retainer to the retainer fitting thereby forming a tapered cover around the articulating joint. The overlapping lamellar rings allow the lamellas to move with respect to each other thereby allowing the cover to move with the articulating joint while still covering and protecting the joint.

General Description

Various examples of the devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed herein are lamellar covers for use with various articulating joints. In one application, as shown in FIG. 1, the lamellar cover 100 can be used with a data center robot 10. The data center robot 10 includes a base portion 12 with an arm 14 extending from the base portion 12 to support a robot head 16. The robot head 16 is connected to arm 14 with an articulating joint 18. The articulating joint 18 allows the robot head 16 to rotate or pivot about at least two axes of rotation relative to the arm 14 for movement forward, backward, left, and right. The lamellar cover 100 is positioned between the robot head 16 and arm 14 to cover the articulating joint 18. The lamellar cover 100 creates a protective structure around the articulating joint 18 without intruding into the joint's operating envelope.

Figure 2:
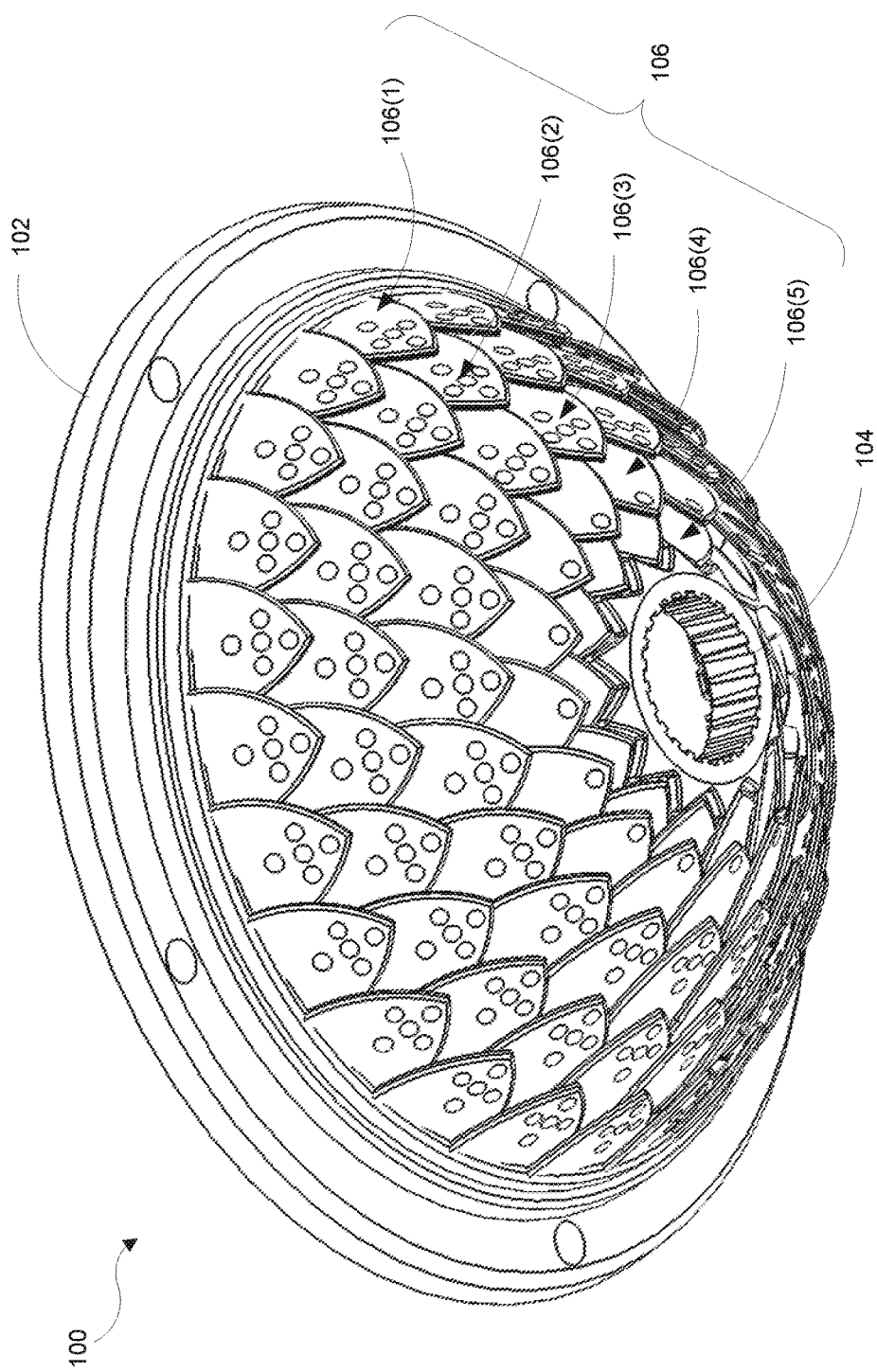
FIG. 2 is a perspective view of the lamellar cover shown in FIG. 1.

With further reference to FIG. 2, the lamellar cover 100 includes an annular retainer ring 102 fixedly attached to the robot head 16, such that the retainer ring 102 substantially does not move relative to the robot head 16. The lamellar cover 100 also includes a retainer fitting 104 fixedly attached to the arm 14, such that the retainer fitting 104 substantially does not move relative to the arm 14. Accordingly, the annular ring 102 is positionable adjacent a first portion (e.g., robot head 16) of the articulating joint 18 and the retainer fitting 104 is positionable adjacent a second portion (e.g., arm 14) of the articulating joint 18.

Figure 3:
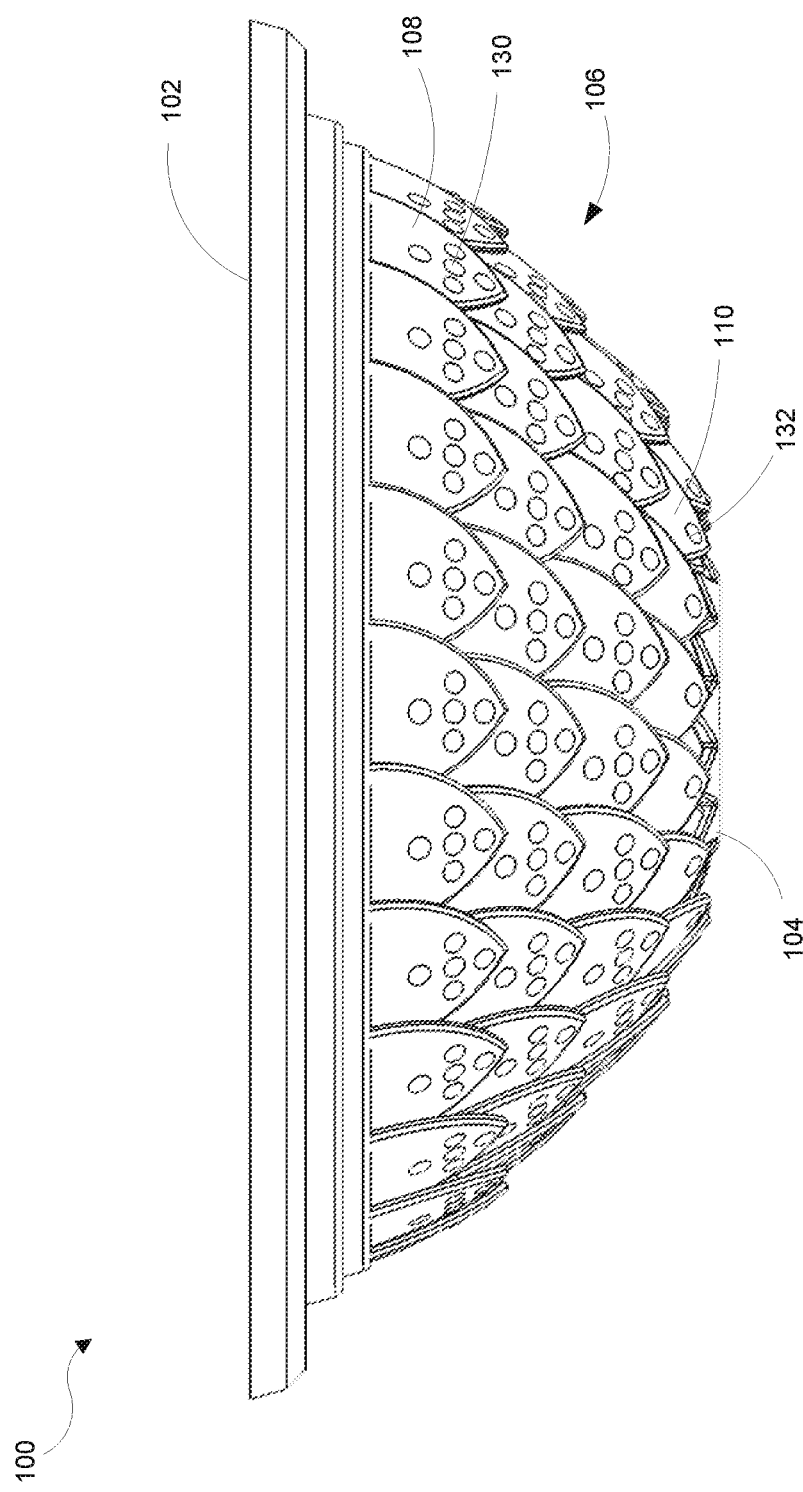
FIG. 3 is a side view of the lamellar cover shown in FIGS. 1-2.

The lamellar cover 100 includes a plurality of overlapping lamellar rings 106(1)-106(5), (collectively, lamellar rings 106). The overlapping lamellar rings 106 are supported between the annular retainer 102 and the retainer fitting 104 as described below with respect to FIGS. 8 and 9. With further reference to FIG. 3, it can be appreciated that the lamellar rings 106 taper between the annular ring 102 and the retainer fitting 104. Each lamellar ring 106 includes a plurality of overlapping lamellas or protective plates 108. In some embodiments, the lamellas 108 include a pattern of bumps 130 to provide one or more water drip points to facilitate removal of any water running down the cover. In some embodiments, the lamellas include different bump patterns such as lamellas 110 which have a single bump 132, for example. The diameter of the lamellar rings 106 and the curvature and shape of the various lamellas 108/110 can vary depending on the desired curvature or shape of the cover 100. While the representative embodiments disclosed herein are described with respect to a spherical or frusto-spherical shape, other shapes such as conical or frusto-conical shapes can be used. Furthermore, the disclosed lamellar cover technology can be applied in applications requiring different shapes and configurations such as flat or rectangular covers, for example.

Figure 4:
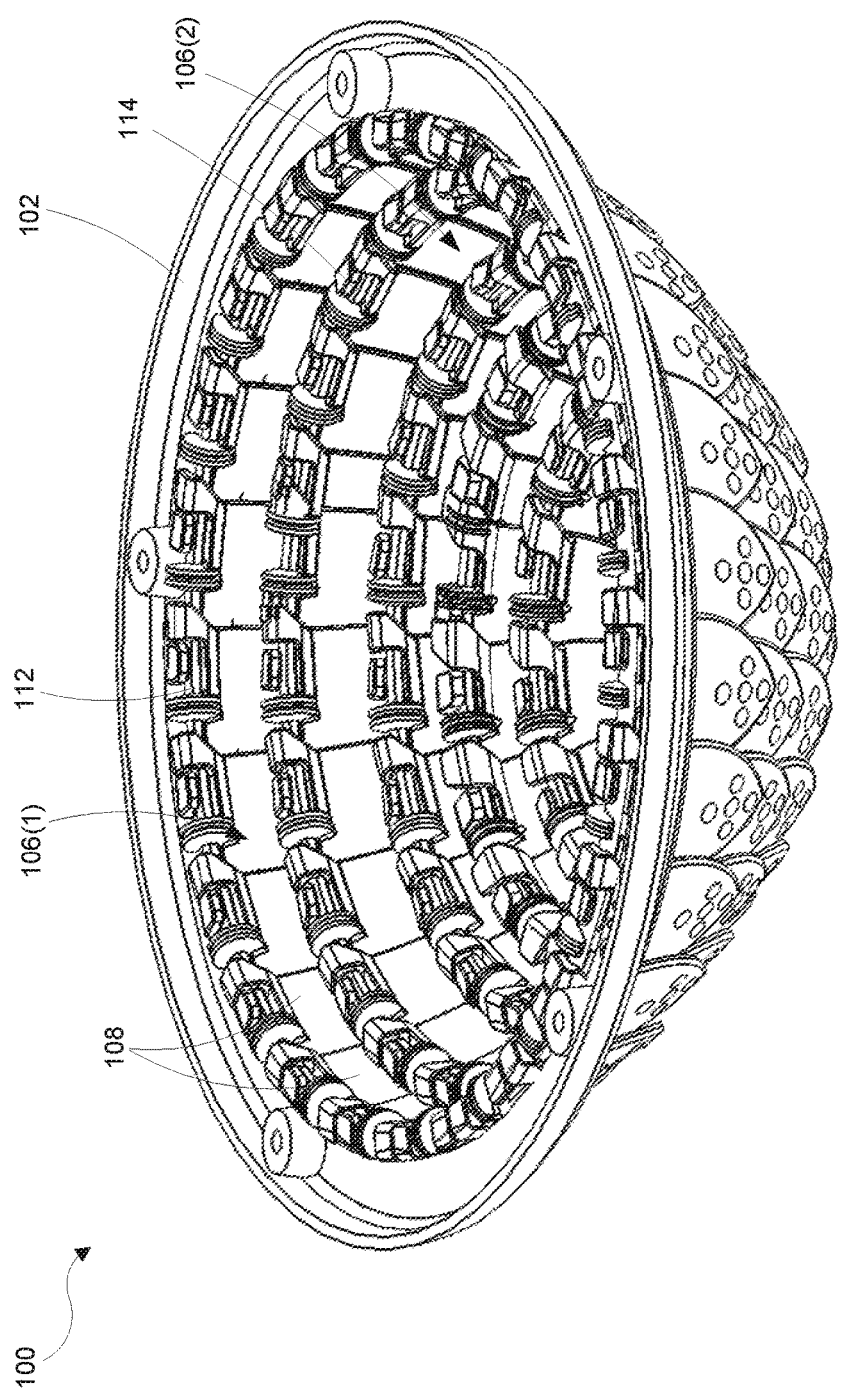
FIG. 4 is a perspective view of the lamellar cover shown in FIGS. 2 and 3 as viewed from the inside.

As shown in FIG. 4, the lamellas 108 of each lamellar ring 106 are coupled to a support element 112/114. For example, each lamella 108 of lamellar ring 106(1) is coupled to a support element 112, which in this case is a circular support ring. In the depicted embodiment, each overlapping lamellar ring 106 has a support ring diameter decreasing in size as the lamellar rings 106 move away from the annular support ring 102. For example, lamellar ring 106(2) includes a support ring 114 having a diameter smaller than the diameter of support ring 112. In some embodiments, the support elements comprise flexible elements. In other embodiments, the support elements are rigid, or combinations of rigid and flexible elements. In some embodiments, the support rings 112/114 comprise flexible o-rings.

Figure 5:
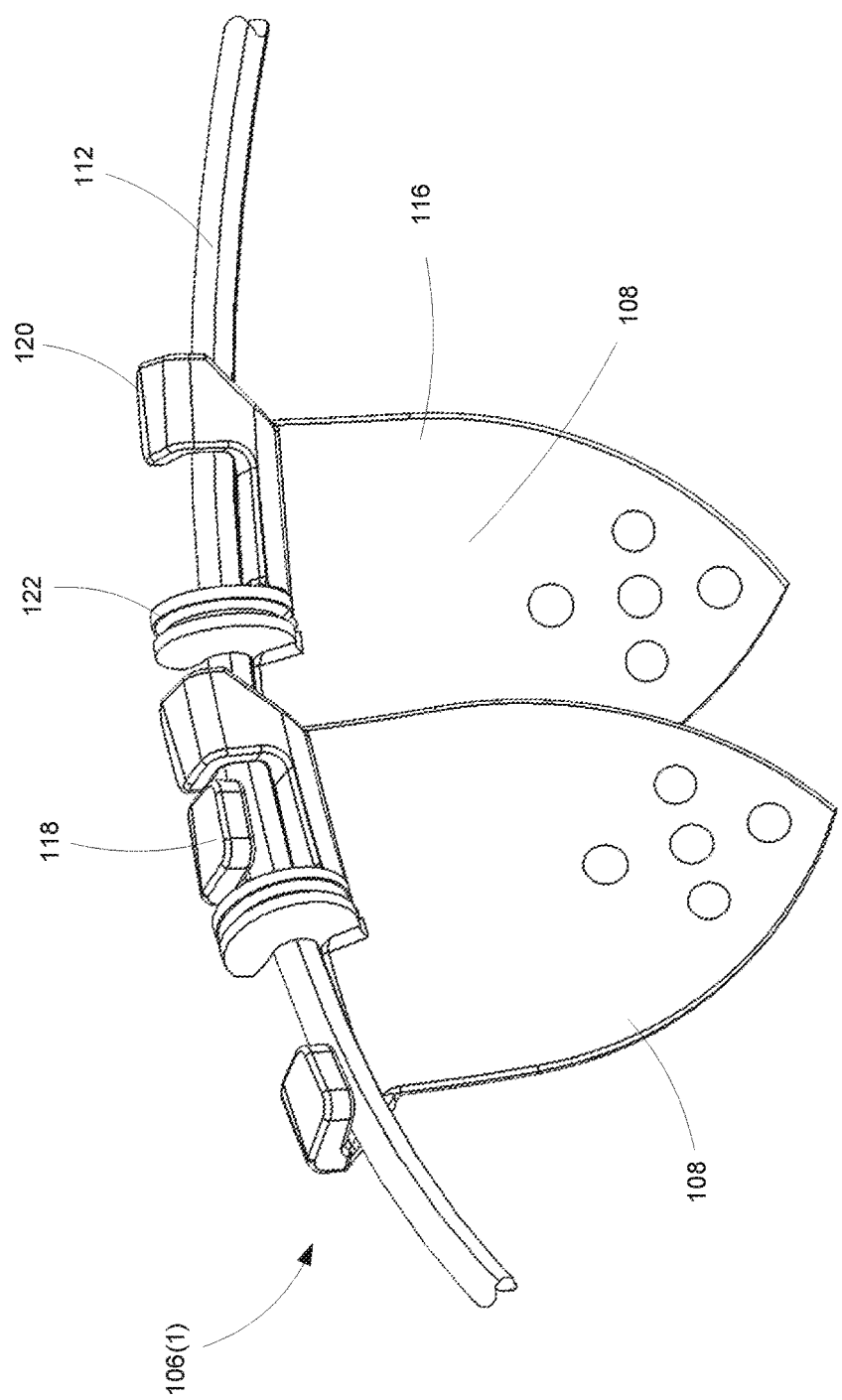
FIG. 5 is a partial perspective view of a lamellar ring.
Figures 6, 7:
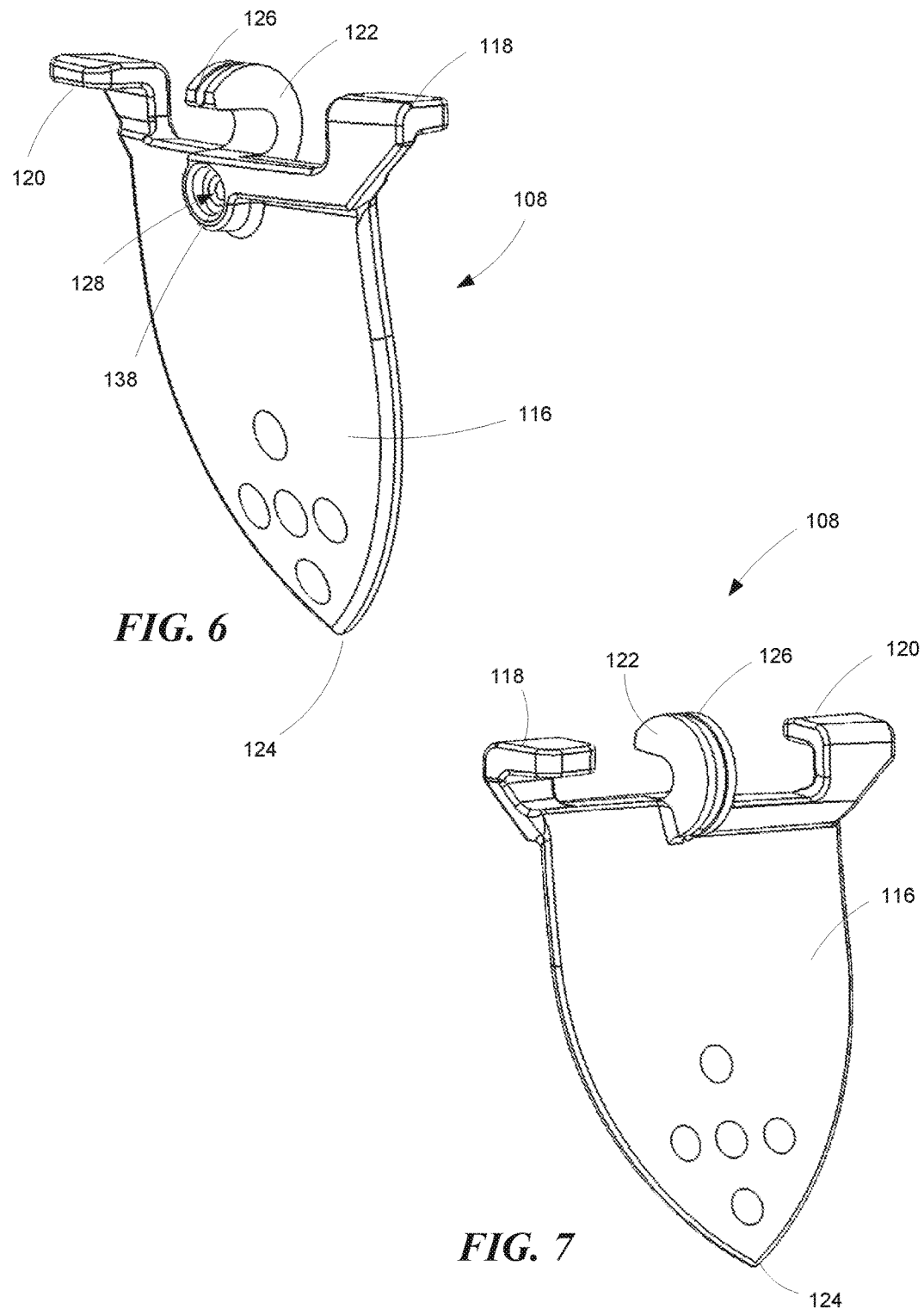
FIG. 6 is a perspective view of a lamella according to a representative embodiment as viewed from the front.
FIG. 7 is a perspective view of the lamella shown in FIG. 6 as viewed from the back.

As shown in FIG. 5, the lamellas 108 are each coupled to its respective support ring 112 with a pair of hook portions 118 and 120 that attach to the support ring. In some embodiments, the hook portions 118 and 120 are oppositely facing with respect to each other. The lamellas 108 include a plate portion 116 from which the opposite facing hook portions 118 and 120 extend. Each lamella 108 also includes a knuckle portion 122 positioned between the hook portions 118 and 120 to facilitate connecting the lamellar rings 106 to each other. The hook portions 118 and 120 of adjacent lamella 108 are interleaved thereby facilitating overlap of the lamellas 108. With further reference to FIGS. 6 and 7, the knuckle portion 122 includes a connector groove 126 extending around the knuckle portion and leading into an anchoring aperture 128. An anchor bore 138 is positioned around the anchor aperture 128. In some embodiments, the plate portion 116 of each lamella 108 is in the form of a scale having a pointed portion 124. In various embodiments, the lamellas 108 can have different shapes, such as for example, round, rectangular, or oval.

Figure 8:
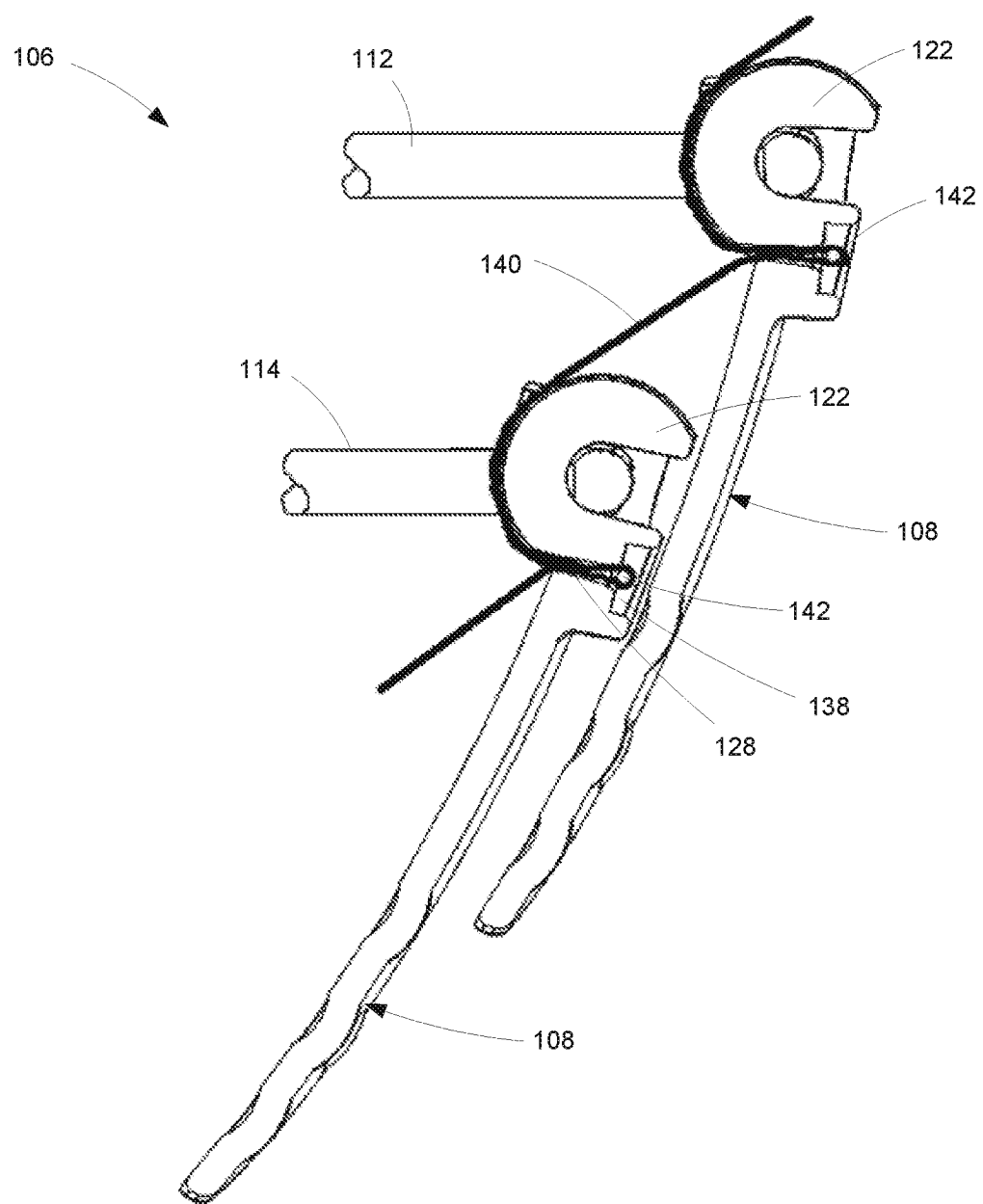
FIG. 8 is a partial cross-sectional view illustrating a connector element arrangement according to a representative embodiment.

As shown in FIG. 8, the lamellar cover 100 includes one or more connectors 140 extending between adjacent lamellar rings 106. In some embodiments, connector element 140 is a continuous flexible cord or cable extending between the lamellas 108. In one embodiment, the connector 140 extends through the cable aperture 128 and is anchored in the anchor bore 138 by an anchor pin 142. For example, the connector 140 can wrap around the anchor pin 142 thereby securing it in the anchor bore 138. The connector 140 doubles back through the cable aperture 128 and extends around the knuckle 122 and connects to an adjacent lamella 108.

The connector element 140 connects each lamellar ring 106 to each other and can also be used to connect the lamellar rings to the annular retainer 102 (FIG. 4). It should be appreciated that when the lamellar rings 106 are pulled apart, the connector element 140 acts on the knuckle portions 122 to rotate the lamella 108 inward thereby keeping the cover continuous. The overlapping lamellas 108 and flexible support elements 112/114 allow the lamellar rings 106 to move with respect to each other, thereby allowing the cover to move with the articulating joint while still covering and protecting the joint.

The lamellar cover 100 moves when the joint 18 articulates and the robot head 16 moves relative to the arm 14 (FIG. 1). The adjacent lamellar rings 106 move relative to each other so they are closer together on one side of the cover 100, and further apart from each other on the opposite side. The lamellas 108 on the adjacent rings move along a frusto-conical or partially spherical path, such that they slide relative to each other during pivoting/rotation of the joint 18. During the movement, the lamellas can pivot on their respective support rings 112.

Figure 9:
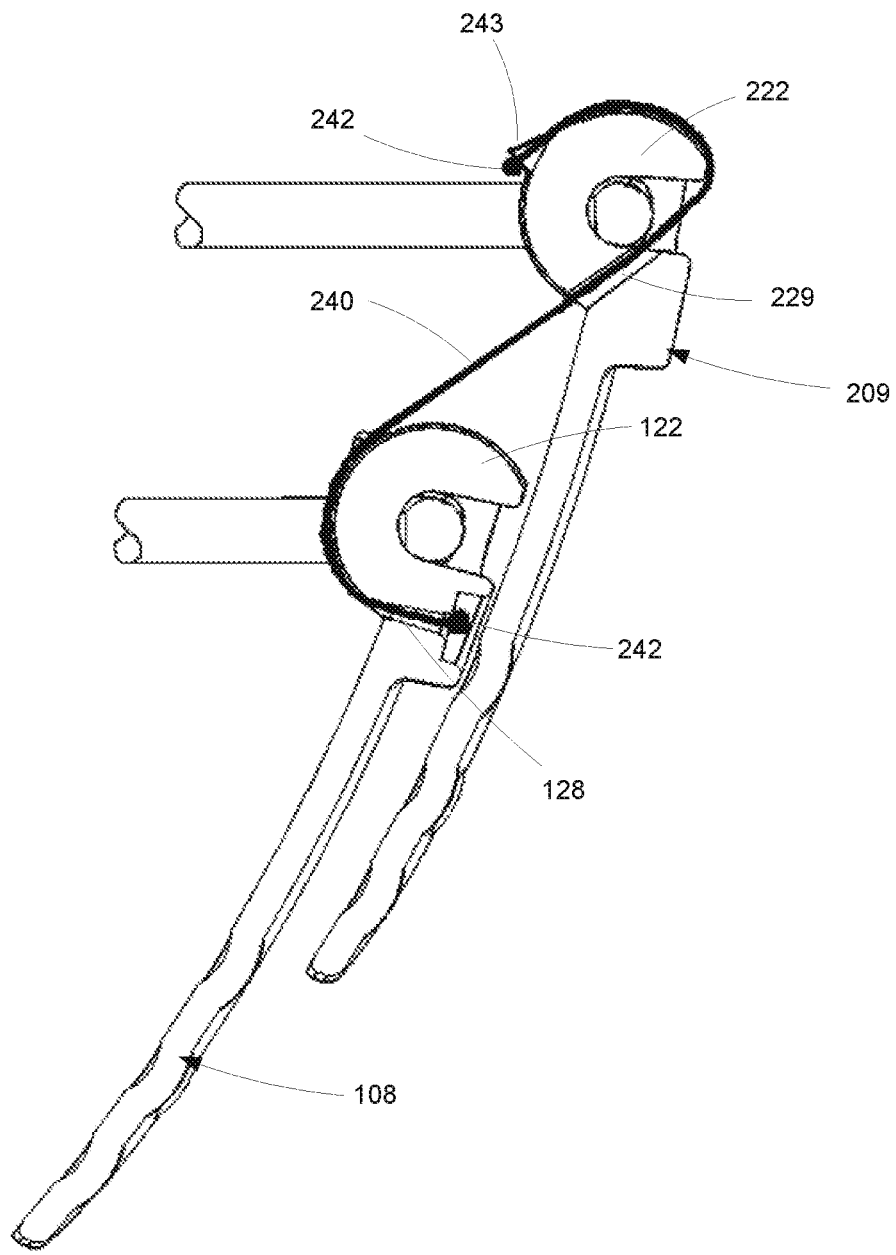
FIG. 9 is a cross-sectional view illustrating a connector element arrangement according to another representative embodiment.

FIG. 9 illustrates an alternative embodiment for implementing a connector element 240. In this embodiment, the connector element 240 extends between lamella 108 and lamella 209. The lamella 108 is similar to those described previously, while the lamella 209 includes an alternative knuckle portion 222. The connector element 240 is anchored in cable aperture 128 and extends around knuckle portion 122 and through the cable aperture 229 of lamella 209, as shown. The connector element 240 continues around knuckle portion 222 and is anchored in an anchor notch 243 formed on the knuckle portion 222. In this embodiment, the anchors 242 can be implemented as crimped cable stops or other suitable fittings.

Remarks

The above description, drawings, and appendices are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A tapered lamellar cover for use with an articulating joint, the cover comprising:
   an annular retainer positionable adjacent a first portion of the articulating joint;
   a retainer fitting positionable adjacent a second portion of the articulating joint moveable with respect to the annular retainer;
   a plurality of overlapping lamellar rings supported between the annular retainer and the retainer fitting, each lamellar ring including:
   a circular support ring; and
   a plurality of lamellas coupled to the circular support ring; and
   one or more connectors extending between adjacent lamellar rings;
   wherein each of the plurality of overlapping lamellar rings has a ring diameter and wherein one or more of the ring diameters decrease in size with respect to each other from the annular retainer to the retainer fitting thereby forming a tapered cover around the articulating joint.

2. The lamellar cover of claim 1, wherein the circular support rings are flexible.

3. The lamellar cover of claim 1, wherein the tapered cover is frusto-spherical in shape.

4. The lamellar cover of claim 1, wherein each lamella includes a pair of hook portions attached to a corresponding circular support ring.

5. The lamellar cover of claim 4, wherein the hook portions of adjacent lamellas are interleaved with respect to each other.

6. The lamellar cover of claim 5, wherein the lamellas of each lamellar ring overlap each other.

7. The lamellar cover of claim 1, wherein the one or more connectors are coupled to corresponding lamellas on adjacent lamellar rings.

8. A lamellar cover, comprising:
   first and second spaced apart support rings;
   a first row of first protective plates coupled to the first support ring; and
   a second row of second protective plates coupled to the second support ring and overlapping the first row of first protective plates;
   wherein the first protective plates and the second protective plates each include corresponding hook portions connected to the first and second support rings, respectively; and
   one or more connectors movably interconnecting the first row and the second row.

9. The lamellar cover of claim 8, wherein the first and second spaced apart support rings comprise flexible o-rings.

10. The lamellar cover of claim 8, wherein the first support ring has a first diameter and the second support ring has a second diameter larger than the first diameter.

11. The lamellar cover of claim 8, wherein the first protective plates overlap each other and the second protective plates overlap each other.

12. The lamellar cover of claim 8, wherein the one or more connectors are coupled to corresponding first and second protective plates on the first and second rows.

13. The lamellar cover of claim 12, wherein the first protective plates and the second protective plates each include a corresponding knuckle positioned between the hook portions and coupled to a corresponding one of the one or more connectors.

14. A lamellar cover, comprising:
   first and second spaced apart support elements;
   a first row of first protective plates coupled to the first support element; and
   a second row of second protective plates coupled to the second support element and overlapping the first row of protective plates;
   wherein the first protective plates and the second protective plates each include corresponding opposite facing hook portions configured to engage the first and second support elements, respectively; and
   one or more connectors extending between the first row and the second row.

15. The lamellar cover of claim 14, wherein the first and second support elements comprise rings.

16. The lamellar cover of claim 14, wherein the first protective plates overlap each other and the second protective plates overlap each other.

17. The lamellar cover of claim 16, wherein the opposite facing hook portions of adjacent first protective plates are interleaved and the opposite facing hook portions of adjacent second protective plates are interleaved.

18. The lamellar cover of claim 14, wherein the one or more connectors are coupled to corresponding first and second protective plates on the first and second rows.

19. The lamellar cover of claim 14, wherein the first protective plates and the second protective plates each include a corresponding knuckle positioned between the opposite facing hook portions and coupled to a corresponding one of the one or more connectors.

* * * * *